United States Patent
Ma et al.

(10) Patent No.: US 6,293,157 B1
(45) Date of Patent: Sep. 25, 2001

(54) COMPENSATION OF CORIOLIS METER MOTION INDUCED SIGNAL

(75) Inventors: Yamin Ma, Roseville; James D. Adams, Richfield, both of MN (US); Thomas J. Brennan, Farmington Hills, MI (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 09/219,301

(22) Filed: Dec. 21, 1998

Related U.S. Application Data

(60) Provisional application No. 60/070,352, filed on Jan. 2, 1998.

(51) Int. Cl.[7] ............................... G01F 1/84; B05B 3/00; B25J 11/00
(52) U.S. Cl. .................. 73/861.354; 118/323; 901/43
(58) Field of Search .................. 73/861.354, 861.356, 73/195, 196, 198; 118/323; 901/43

(56) References Cited

U.S. PATENT DOCUMENTS

| | | | |
|---|---|---|---|
| 4,481,503 | * 11/1984 | Lehman et al. | 73/195 |
| 4,495,488 | * 1/1985 | Streib | 73/195 |
| 4,691,578 | 9/1987 | Herzl | 73/861.38 |
| 4,768,384 | 9/1988 | Flecken et al. | 73/861.02 |
| 4,902,352 | * 2/1990 | Christian | 134/22.12 |
| 4,922,852 | * 5/1990 | Price | 118/323 |
| 5,027,662 | 7/1991 | Titiow et al. | 73/861.38 |
| 5,224,387 | 7/1993 | Lindenbaum et al. | 73/861.37 |
| 5,228,327 | 7/1993 | Bruck | 73/3 |
| 5,295,084 | * 3/1994 | Arunachalam et al. | 73/861.356 |
| 5,331,859 | * 7/1994 | Zolock | 73/861.356 |
| 5,497,666 | * 3/1996 | Patten et al. | 73/861.356 |
| 5,531,126 | 7/1996 | Drahm | 73/861.35 |
| 5,594,180 | 1/1997 | Carpenter et al. | 73/861.35 |
| 5,639,027 | * 6/1997 | Fritz | 239/414 |
| 5,969,264 | * 10/1999 | Rivkin | 73/861.356 |

* cited by examiner

Primary Examiner—Harshad Patel
(74) Attorney, Agent, or Firm—Douglas B. Farrow

(57) ABSTRACT

The output of a coriolis flow meter is corrected for motion by subtracting the motion portion of the signal from a lookup table or a second dry meter.

3 Claims, 1 Drawing Sheet

COMPENSATION OF CORIOLIS METER MOTION INDUCED SIGNAL

RELATED APPLICATIONS

Figure 1:
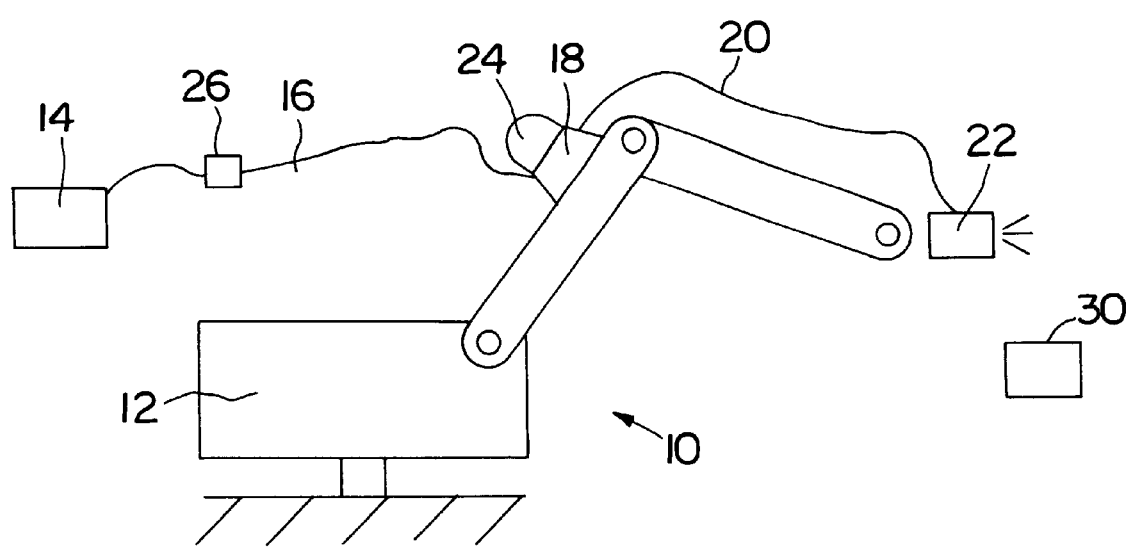

This application is a continuation-in-part of U.S. application Ser. No. 60/070,352, filed Jan. 2, 1998.

BACKGROUND OF THE INVENTION

Coriolis type flow meters are of course well known for use in sensing flow rates of various materials. Such meters have traditionally been designed for fixed applications.

SUMMARY OF THE INVENTION

It has been discovered that when such meters are utilized in non-stationary applications such as being attached into a robot for robotically applying sealants and adhesives and the like that a motion induced signal is provided which must be corrected that is, a flow may be shown even though the apparatus is not dispensing any fluid at all.

It is therefore an object of this invention to provide a method of compensating for this motion induced signal.

Several methods may be utilized in order to do so. First of all a second "dry" coriolis meter or other coriolis motion sensing device may be utilized along with the normal coriolis flow sensing meter to provide both a motion signal (from the dry meter) and a total resultant signal (from the normal meter). Thus, the motion signal may be subtracted from the total resultant signal to determine the true amount of flow.

In another application, only one meter is utilized but for a given robot motion program, the meter is run dry for a sample run which provides a motion signal which is then entered into a look-up table and subtracted from the total resultant signal during actual dispensing.

In yet another embodiment, two conventional meters are used in series with one being located on the moving object (robot) and the other being fixed.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is a schematic view of the instant invention.

DESCRIPTION OF THE PREFERRED EMBODIMENT

The instant invention, generally designated 10, is shown in FIG. 1. A robot 12 is used and connected to a source 14 of pressurized fluid in line 16 leading to coriolis meter 18 which in turn feeds line 20 to application device 22. A second dry coriolis meter 24 is provided at the same location as meter 18. The signal from meter 24 is subtracted from the meter 18 signal to give a true flow signal.

In another embodiment, only meter 18 is used and the robot is cycled through its program and the output of meter 18 placed into a lookup table. When fluid is actually dispensed through meter 18, the actual value therefrom has the value from the lookup table 30 at the appropriate point in the cycle subtracted from it to give the actual flow.

It is contemplated that various changes and modifications may be made to the meter compensation system without departing from the spirit and scope of the invention as defined by the following claims.

What is claimed is:

1. A system for measuring a flow of a fluid moving coriolis meter, the system comprising:

a moving object;

a fluid source;

a first coriolis meter mounted to said moving object and connected to a said fluid source for flow measurement, said first coriolis meter providing an output, a second coriolis meter connected to said moving object adjacent said first meter, said second meter not being connected to a fluid source, said second coriolis meter providing an output, and subtracting the output of said second meter from said output of said first meter to provide an accurate indication of flow.

2. A method for measuring a flow of a fluid, the method comprising the steps of:

mounting a first coriolis meter to a moving object and connecting said first meter to a fluid source for flow measurement, said first coriolis meter providing an output;

mounting a second coriolis meter to said moving object adjacent said first meter, said second meter not being connected to said fluid source, said second coriolis meter providing an output; and subtracting the output of said second meter from said output of said first meter to provide an accurate indication of flow.

3. A method for measuring a flow of a fluid meter, the method comprising the steps of:

mounting a coriolis meter to a moving object and connecting said meter to a fluid source for flow measurement, said coriolis meter providing output;

moving said moving object through a predetermined pattern while no fluid is flowing through said meter and recording a resulting no flow output of said meter over time through said pattern;

moving said moving object through a predetermined pattern while fluid is flowing through said meter to provide a flow output and subtracting said no flow output from said flow output at equivalent positions in said pattern to provide an accurate indication of flow.

* * * * *